(12) United States Patent
Nambara (10) Patent No.: US 10,606,074 B2
(45) Date of Patent: Mar. 31, 2020

(54) HEAD-UP DISPLAY APPARATUS

(71) Applicant: DENSO CORPORATION, Kariya, Aichi-pref. (JP)

(72) Inventor: Takahiro Nambara, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/575,022

(22) PCT Filed: May 10, 2016

(86) PCT No.: PCT/JP2016/002292
§ 371 (c)(1),
(2) Date: Nov. 17, 2017

(87) PCT Pub. No.: WO2016/194305
PCT Pub. Date: Dec. 8, 2016

(65) Prior Publication Data
US 2018/0136463 A1    May 17, 2018

(30) Foreign Application Priority Data

Jun. 5, 2015  (JP) ................................ 2015-114904

(51) Int. Cl.
*G02B 27/01*  (2006.01)
*B60K 35/00*  (2006.01)
(Continued)

(52) U.S. Cl.
CPC .......... *G02B 27/0101* (2013.01); *B60K 35/00* (2013.01); *G02B 3/08* (2013.01);
(Continued)

(58) Field of Classification Search
CPC .......... F21V 5/045; G02B 27/01–0198; G02B 5/0221; G02B 5/021
See application file for complete search history.

(56) References Cited

U.S. PATENT DOCUMENTS

2007/0024977 A1    2/2007  Kawamura et al.
2008/0238814 A1*  10/2008  Ishikawa ............ G02B 27/0101
                                                    345/7
(Continued)

FOREIGN PATENT DOCUMENTS

CN    204215104 U    3/2015
JP    2007108429 A    4/2007
(Continued)

*Primary Examiner* — Cara E Rakowski
*Assistant Examiner* — Christopher A Lamb, II
(74) *Attorney, Agent, or Firm* — Harness, Dickey & Pierce, P.L.C.

(57) ABSTRACT

A HUD apparatus is provided. The HUD apparatus is provided with: an optical source part having a light emission element; a condenser lens, which faces the optical source part, and collects light source light; a field lens, which further collects the light source light transmitted from the condenser lens side, and which projects light at a predetermined angle; and an image formation element, which forms an image when the light source light transmitted from the field lens side is inputted thereto, and which projects light of an image toward the windshield side. The field lens has a composite surface on at least one of the condenser lens side and the image formation element side, the composite surface having multiple continuous optical surfaces. The condenser lens has a diffusion part that diffuses the light source light.

11 Claims, 8 Drawing Sheets

(51) Int. Cl.
  *G02B 5/02* (2006.01)
  *G02B 3/08* (2006.01)
(52) U.S. Cl.
  CPC ...... *G02B 5/0221* (2013.01); *B60K 2370/155* (2019.05); *B60K 2370/334* (2019.05)

(56) References Cited

U.S. PATENT DOCUMENTS

| | | | | |
|---|---|---|---|---|
| 2009/0027589 | A1* | 1/2009 | Yamazoe | G02B 27/0101 |
| | | | | 349/62 |
| 2009/0140633 | A1* | 6/2009 | Tanimoto | H01L 33/504 |
| | | | | 313/503 |
| 2012/0281293 | A1* | 11/2012 | Gronenborn | B23K 26/0608 |
| | | | | 359/619 |
| 2014/0022645 | A1* | 1/2014 | Matsuura | G02B 27/0101 |
| | | | | 359/626 |
| 2015/0043081 | A1* | 2/2015 | Segawa | G02B 5/02 |
| | | | | 359/599 |
| 2016/0147061 | A1 | 5/2016 | Nambara | |
| 2016/0298822 | A1* | 10/2016 | Michiels | F21V 5/002 |
| 2016/0334075 | A1 | 11/2016 | Nambara | |
| 2016/0363747 | A1* | 12/2016 | Krijn | G02B 19/0066 |
| 2018/0052322 | A1* | 2/2018 | Kubota | G02B 3/0056 |

FOREIGN PATENT DOCUMENTS

| | | | |
|---|---|---|---|
| JP | 2015004825 A | 1/2015 | |
| JP | 2015133304 A | 7/2015 | |

\* cited by examiner

HEAD-UP DISPLAY APPARATUS

CROSS REFERENCE TO RELATED APPLICATIONS

This application is a U.S. National Phase Application under 35 U.S.C. 371 of International Application No. PCT/JP2016/002292 filed on May 10, 2016 and published in Japanese as WO 2016/194305 A1 on Dec. 8, 2016. This application is based on and claims the benefit of priority from Japanese Patent Application No. 2015-114904 filed on Jun. 5, 2015. The entire disclosures of all of the above applications are incorporated herein by reference.

TECHNICAL FIELD

The present disclosure relates to a head-up display apparatus (hereinafter referred to as a "HUD apparatus") that is mounted to a mobile body and displays a virtual image of an image so that an occupant can visually confirm the image.

BACKGROUND ART

There is a known HUD apparatus that is mounted to a mobile body and displays a virtual image of an image so that an occupant can visually confirm the image. The HUD apparatus disclosed in Patent Literature 1 includes an optical source part, which has a light emission element emitting an optical source light, a condenser lens, which faces the optical source part and collects an optical source light, and a field lens, which further collects the optical source light from the condenser lens side and projects the optical source light at a predetermined angle. The HUD apparatus further includes an image formation element, which forms an image by the optical source light entering from the field lens side and emits the light of the image to a projection member side.

The field lens forms a single surface made of a single optical surface, as a surface on the condenser lens side and as a surface on the image formation element side. A diffusion plate is arranged between the condenser lens and the field lens, as a diffusion part that diffuses an optical source light.

PRIOR ART LITERATURE

Patent Literature

Patent Literature 1: JP 2007-108429 A

SUMMARY OF INVENTION

The HUD apparatus may generate color unevenness in a displayed virtual image. The reason for the color unevenness is that lights from the light emission element of the optical source part come to present different colors according to light emission parts or directions in some case. To deal with the difficulty, the inventor of the present application has devised a method that can suppress the occurrence of color unevenness. According to the method, a composite surface made of connecting optical surfaces is employed as at least one of a surface on the condenser lens side and a surface on the image formation element side of the field lens, so that the optical source lights presenting different colors according to directions are mixed with each other.

While the method that uses the field lens can produce the effect of suppressing the occurrence of color unevenness, the arrangement of the diffusion plate in Patent Literature 1 causes another difficulty such that an optical source light having passed through the condenser lens enters the diffusion plate, with its optical amount per unit area being smaller, and this causes reduction in the density of the diffused light, which leads to an insufficient luminance for virtual image display projected to the projection member.

It is an object of the present disclosure to provide an HUD apparatus that exhibits an excellent visibility for virtual image display by concurrently achieving suppression of color unevenness and high luminance.

According to one aspect of the present disclosure, a head-up display apparatus is mounted to a mobile body, projects an image to a projection member to display a virtual image of the image so that an occupant enables to visually confirm the image, the head-up display apparatus including: an optical source part that has a light emission element emitting an optical source light; a condenser lens that faces the optical source part and collects the optical source light; a field lens that further collects the optical source light from a side of the condenser lens and projects the optical source light at a predetermined angle; and an image formation element that forms an image by incidence of the optical source light from a side of the field lens, and emits light of the image to a side of the projection member. The field lens has a composite surface on a surface of at least one of the side of the condenser lens and a side of the image formation element, the composite surface being made of a plurality of optical surfaces connecting to each other. The condenser lens has a diffusion part that diffuses the optical source light.

In the head-up display apparatus according to the present disclosure, when the light emission element of the optical source part emits optical source lights presenting different colors according to light emission parts or directions, firstly the optical source lights enter the condenser lens that faces the optical source part. The condenser lens, which has the diffusion part, collects optical source lights with large optical amounts per unit area while diffusing the lights. The optical source lights are mixed with different colors, and the density of the lights is prevented from decreasing.

After passing through the condenser lens, the optical source lights of different colors are additionally mixed by the composite lens of the field lens, which is made of optical surfaces connecting to each other. Since an image formed of the mixed optical source lights is projected to the projection member, it may be possible to provide an HUD apparatus that exhibits an excellent visibility for virtual image display by concurrently achieving suppression of the occurrence of color unevenness and high luminance.

BRIEF DESCRIPTION OF DRAWINGS

The above and other aspects, features and advantages of the present disclosure will become more apparent from the following detailed description made with reference to the accompanying drawings. In the drawings.

DESCRIPTION OF EMBODIMENTS

Embodiments of the present disclosure will be described below with reference to the drawings. Corresponding components between the embodiments are denoted by the same reference numbers so that overlapping descriptions can be omitted as needed. When the configurations of one embodiment have been specified only partly in the specification, the rest of the configurations of the embodiment can be described by applying the configurations of another embodiment previously described. Further, not only a combination of the configurations specified in the descriptions of the embodiments but also a combination of different parts of the configurations of the embodiments not specified are applicable as long as the combination does not conflict with the gist of the configuration.

First Embodiment

Figure 1:
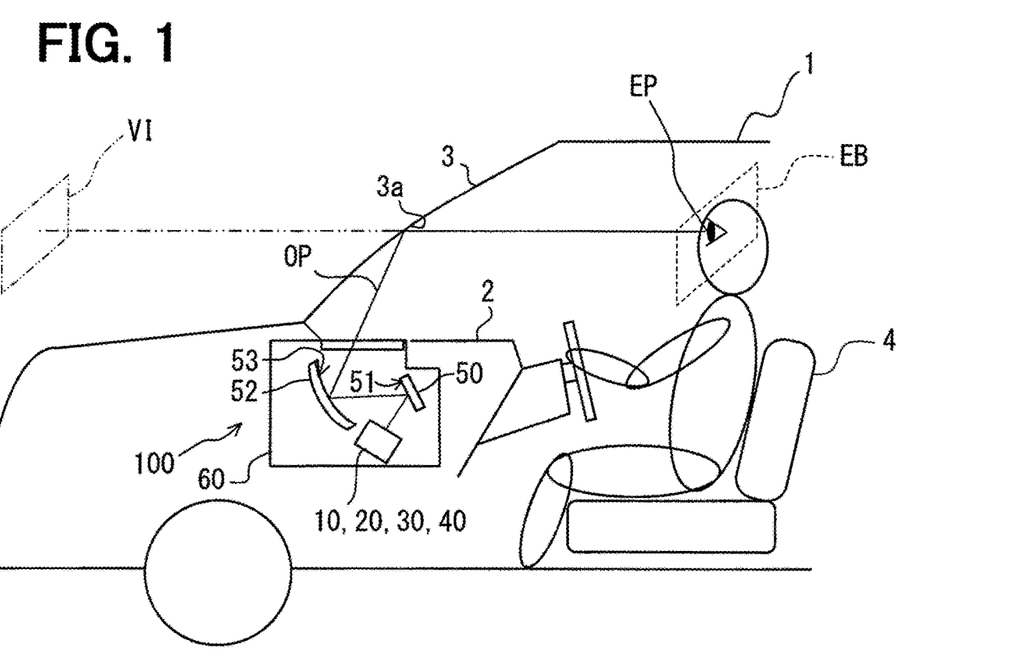
FIG. 1 is a diagram schematically illustrating a state in which an HUD apparatus is mounted to a vehicle in a first embodiment.

As shown in FIG. 1, an HUD apparatus 100 in the first embodiment is mounted to a vehicle 1, which is a mobile body, and is housed in an instrument panel 2. The HUD apparatus 100 projects an image to a windshield 3 that is a projection member of the vehicle 1, and displays a virtual image of the image, using reflection of a light of the image from the windshield 3, so that the image can be visually confirmed by an occupant in the vehicle 1. In other words, when the light of the image is reflected from the windshield 3 and reaches the eyes of an occupant in the cabin of the vehicle 1, the occupant perceives the light of the image as a virtual image VI and can recognize various types of information from the virtual image VI. The examples of the information to be displayed in the virtual image VI include a vehicle speed, a vehicle state value such as a fuel remaining amount, and navigation information such as road information and vision assisting information.

The windshield 3 in the vehicle 1 is a plate made of translucent glass or synthetic resin, for example. In the windshield 3, a surface on the vehicle room side is formed as a projection surface 3a onto which the image is projected, in a curved concave surface or a flat planar surface. As the projection member, a combiner separate from the vehicle 1 may be set in the vehicle 1 instead of the windshield 3 to receive projection of an image.

The specific structure of the HUD apparatus 100 will be described based on FIG. 1 and FIG. 2. The HUD apparatus 100 includes an optical source part 10, a condenser lens 20, a field lens 30, an image formation element 40, a plane mirror 50, and a concave mirror 52, which are housed and held in a housing 60.

The optical source part 10 includes an optical source circuit board 12 and multiple light emission elements 14. The optical source circuit board 12 electrically connects the power source and each light emission element 14 to each other through an interconnection pattern on the board 12. Each light emission element 14 is a light emission diode element generating a small amount of heat, and generates an optical source light with a light emission amount corresponding to an electric current amount by power distribution. Each light emission element 14 in the first embodiment is a white light emission diode element having a blue light emission diode element 14a and an yellow fluorescent material 14b covering the blue light emission diode element.

Figure 3:
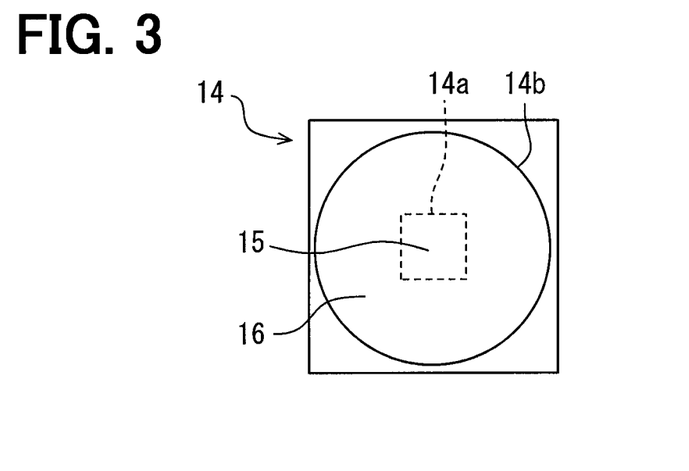
FIG. 3 is a diagram illustrating a light emission element in the first embodiment viewed from the condenser lens.

More specifically, each light emission element 14 is formed by sealing the blue light emission diode element 14a having a chip shape and provided in a center area 15 with the yellow fluorescent material 14b, as shown in FIG. 3. The yellow fluorescent material 14b is obtained by mixing a yellow fluorescent agent with a translucent synthetic resin. The yellow fluorescent material 14b is excited by the blue light from the blue light emission diode element 14a, to emit yellow light, and the blue light and the yellow light are synthesized to realize an optical source light of a false white color.

Figure 4:
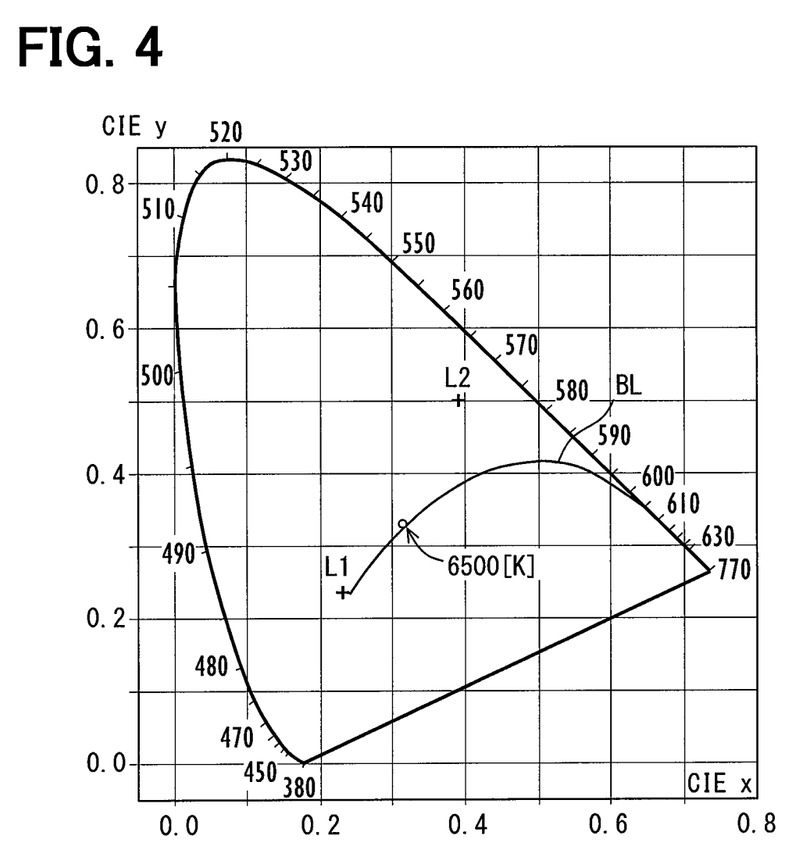
FIG. 4 is a diagram illustrating a chromaticity describing the colors of optical source lights emitted from the light emission element in the first embodiment.

According to a light emission distribution experiment by the inventor of the present application, however, an optical source light L1, which is emitted from the center area 15 of each light emission element, is a bluish white light with a small deviation from a black body locus BL where a color temperature is 6500K or higher in the chromaticity diagram of FIG. 4. On the other hand, an optical source light L2, which is emitted from a peripheral area 16 of each light emission element is a yellow light with a large deviation from the black body locus BL in the chromaticity diagram of FIG. 4. Therefore, each light emission element 14 emits optical source lights presenting different colors according to light emission parts or directions.

Figure 2:
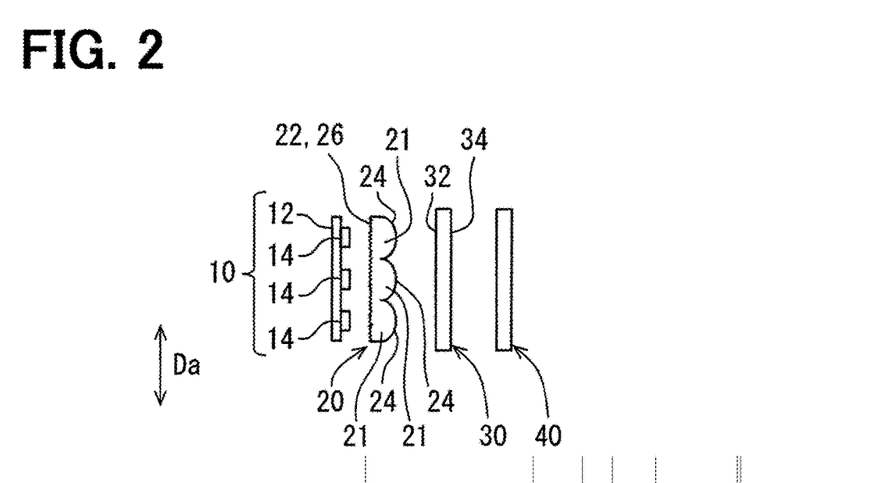
FIG. 2 is a diagram schematically illustrating the general arrangement of an optical source part, a condenser lens, a field lens, and a liquid crystal panel in the first embodiment.

As illustrated in FIG. 2, in the optical source part 10, the light emission elements 14 are arranged in a row in an array direction Da along the optical source circuit board 12. The optical source lights from the light emission elements 14 enter the condenser lens 20.

The condenser lens 20 is made of translucent synthetic resin or glass, for example, and is located between the optical source part 10 and the field lens 30. Thus, the condenser lens 20 faces the optical source part 10.

Specifically, the condenser lens 20 is a lens array formed by arranging the same number of lens elements 21 as the number of the light emission elements 14. The lens elements 21 are arranged in the array direction Da as well to face the light emission elements 14 in one-to-one correspondence. Each lens element 21 has a first refraction surface 22 on a side of the optical source part 10 in a single flat shape common to all the lens elements 21 and the first refraction surface 22 is provided with a diffusion part 26. More specifically, the first refraction surface 22 is formed to be flat in a macroscopic viewpoint, and the diffusion part 26 of each lens element 21 forms a minute, random, and concavo-convex shape as of ground glass. The diffusion part 26 preferably has a haze value of 30% or higher, and actually has a haze value of 50% in the present embodiment.

Further, each lens element 21 forms a second refraction surface 24 on a side of the field lens 30, and the second refraction surface 24 is smooth and convex. The focal length of the condenser lens 20 by each lens element 21 is set larger than the distance between the condenser lens 20 and each light emission element 14.

In the condenser lens 20, an optical source light from a light emission element 14 enters the corresponding lens element 21, and is collected by the refraction action while being diffused by the diffusion part 26. After that, the optical source light enters the field lens 30.

The field lens 30 is made of translucent synthetic resin or glass, for example, and is located between the condenser lens 20 and the image formation element 40. Thus, the field lens 30 faces the image formation element 40. The field lens 30 is a lens that further collects the optical source light from the condenser lens 20 and projects the light to the image formation element 40 at a predetermined angle.

The field lens 30 in the present embodiment is a composite Fresnel lens. Specifically, the field lens 30 forms an incident optical surface 32 in a smooth flat shape on a side of the condenser lens 20, and forms a composite surface 34 made of optical surfaces 35 and 36 connecting to each other on a side of the image formation element 40.

The composite surface 34 will be described in detail below with reference to FIG. 5. The composite surface 34 is formed on the entire region, which corresponds to the light emission elements 14 and to the lens elements 21, of the field lens 30. In other words, the optical source lights from the light emission elements 14 and the lens elements 21 inevitably pass through the composite surface 34.

The composite surface 34 of the present embodiment forms an alternate arrangement structure in which a light collecting optical surface 35 and a deflection optical surface 36 are alternately connected in the array direction Da of the light emission elements 14.

Each light collecting optical surface 35 is formed to be one of the division regions made by dividing a virtual light collecting surface Sic at predetermined widths Ws in the array direction Da. The virtual light collecting surface Sic is a virtual lens array surface where the same number of virtual lens element surfaces Sie as the number of the lens elements 21 or the light emission elements 14 is arranged. Each virtual lens element surface Sie of the virtual light collecting surface Sic is a surface being convex on a side of the image formation element 40, and an array pitch Paf of the virtual lens element surfaces Sie is substantially the same as an arrangement pitch Pac of the lens elements 21 of the condenser lens 20.

Each deflection optical surface 36 is formed to be one of the division regions made by dividing a virtual deflection surface Sid at predetermined widths Ws in the array direction Da of the light emission elements 14. The virtual deflection surface Sid is configured by multiple inclined surfaces Sis that have inclination reversed at every half value of the array pitch Paf of the virtual lens element surfaces Sie, and the inclined surfaces Sis are flat. The inclination of each inclined surface Sis is set to be reversed to the inclination of the virtual light collecting surface Sic at the corresponding position in the array direction Da of the light emission elements 14.

While the predetermined width Ws applied to the division region of the light collecting optical surface 35 and the deflection optical surface 36 are set differently, the amount of the sag between the light collecting optical surface 35 and the deflection optical surface 36 is set to be nearly constant so that the thickness of the entire field lens 30 is constant. Further, the predetermined width Ws is set to be smaller than the pitch Ps between the light emission elements adjacent to each other. With the alternate arrangement of the light collecting optical surface 35 and the deflection optical surface 36, a part of the shape of the virtual light collecting surface Sic and a part of the shape of the virtual deflection surface Sid are extracted and are reproduced on the composite surface 34. In FIG. 5, the size of a part of the predetermined width Ws is shown.

One of the light collecting optical surfaces 35 that has a surface vertex 35a based on each virtual lens element surface Sie is arranged on a straight line Lt connecting the center area 15 of each light emission element 14 and a surface vertex 21a of the second refraction surface 24 of each lens element 21. In the present embodiment, the straight line Lt is substantially perpendicular to the array direction Da of the light emission elements 14.

In the manner as described above, an optical source light that has passed through a light collecting optical surface 35 of the composite surface 34 is collected. More specifically, the optical source light is collected so that the travelling direction of the optical source light after passing through a light collecting optical surface 35 is closer to the direction of the straight line Lt than the travelling direction of the optical source light before passing through the light collecting optical surface 35 is.

On the other hand, an optical source light that has passed through a deflection optical surface 36 of the composite surface 34 is deflected by the prismatic effect to the side opposite to the side where an optical source light is collected by a light collecting optical surface 35. The deflection to the opposite side herein means that an optical source light is farther from the nearest straight line Lt to the optical source light (in other words, the straight line Lt for the light emission element 14 that emits the optical source light) as the optical source light travels nearer to the image formation element 40.

The image formation element 40 in FIG. 2 is a liquid crystal panel using a thin film transistor (TFT) and more specifically is an active matrix liquid crystal panel formed of multiple liquid crystal pixels arranged in a two-dimensional direction. The image formation element 40 includes a laminate structure of a pair of polarizing plates and a liquid crystal layer in between, for example. The polarizing plates have properties of transmitting a light of a predetermined direction by an electric field vector and blocking a light of a direction substantially perpendicular to the predetermined direction by the electric field vector, and are arranged to be substantially perpendicular to the predetermined direction. The liquid crystal layer is capable of rotating, by applying a voltage to each liquid crystal pixel, the polarization direction of a light entering the liquid crystal layer according to the applied voltage.

Hence, the image formation element 40 is configured to control the transmissivity of an optical source light for each liquid crystal pixel and to form an image, by incidence of the optical source light from the field lens 30. The liquid crystal pixels are each provided with a color filter and the color filters of adjacent liquid crystal pixels present different colors from each other (red, green, or blue, for example). Combinations of the filters can produce various different colors. The image formation element 40 emits a light of an image to the plane mirror 50 on a side of the windshield 3 in an optical path OP in FIG. 1.

The plane mirror 50 is formed by depositing aluminum for a reflection surface 51 on the surface of a base material made of synthesis resin or glass, for example. The reflection surface 51 is formed into a smooth flat surface. The plane mirror 50 reflects the light of the image from the image formation element 40 to the concave mirror 52.

The concave mirror 52 is formed by depositing aluminum for a reflection surface 53 on the surface of a base material made of synthesis resin or glass, for example. The reflection surface 53 is formed into a smooth curved surface as the recessed center of the concave mirror 52. The concave mirror 52 reflects the light of the image from the plane mirror 50 to the windshield 3.

In that way, an optical source light emitted from each light emission element 14 of the optical source part 10 passes through the diffusion part 26 of the condenser lens 20 and the composite surface 34 of the field lens 30 and then enters the image formation element 40. After that, the optical source light is reflected from the windshield 3 as the light of the image from the image formation element 40 and reaches an eye box EB. The eye box EB is set based on the eyelips of an occupant sitting in a seat 4, where the eye point EP of the occupant can exist, as a region where the occupant can visually confirm a displayed virtual image of the image.

Figure 6:
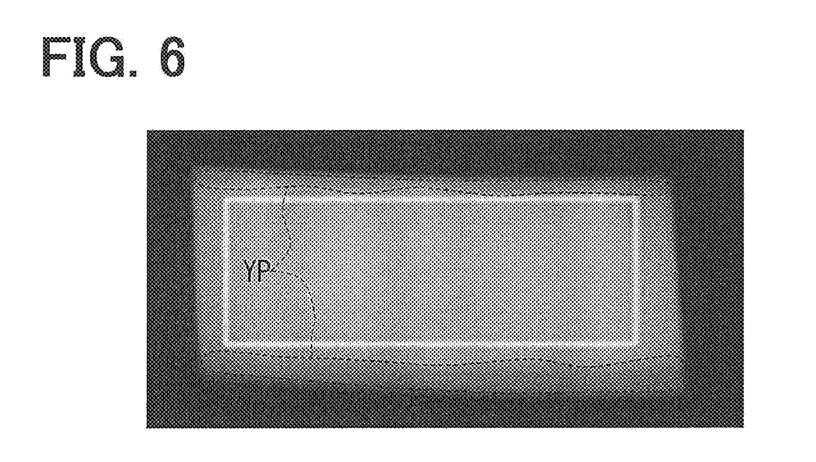
FIG. 6 is an experimental image showing a displayed virtual image observed from an upper end of an eye box in a comparative example.
Figure 7:
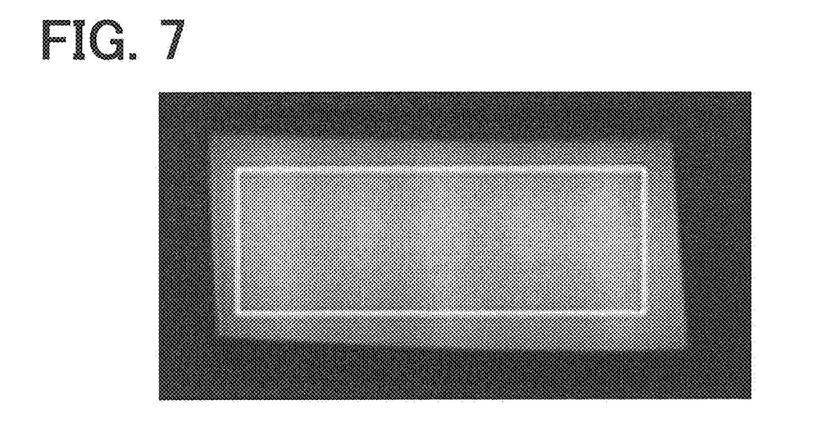
FIG. 7 is a diagram corresponding to FIG. 6 in the first embodiment.

The description will be made below on how a virtual image of an image is displayed, based on an experiment by the inventor of the present application. FIG. 6 and FIG. 7 illustrate virtual images observed from the upper end of the eye box EB. FIG. 6 specifically illustrates a comparative example which is different from the present embodiment in that the first refraction surface is a mirror surface and the condenser lens does not have the diffusion part (other configurations are the same as those of the present embodiment), and FIG. 7 specifically illustrates a case of the present embodiment. The distance between each light emission element 14 and the first refraction surface 22 is set to 0.5 mm.

In the comparative example shown in FIG. 6, the upper and lower end parts of the displayed virtual image have not turned white but turned yellow (see the yellow part YP surrounded by the broken line). This indicates that the color distribution in the position of the eye box has come to reflect the light emission distribution of the light emission elements as a result of designing the device so that the light emission elements and the eye box are in a conjugate relation for increasing the usage efficiency of optical source lights. In the present embodiment in FIG. 7, on the other hand, the upper and lower end parts are prevented from turning yellow. Note that the rectangular areas in FIG. 6 and FIG. 7 represent reference positions in the comparison of the images in FIGS. 6 and 7.

(Actions and Effects)

The actions and effects obtained in the first embodiment set forth above will be described below.

According to the first embodiment, when the light emission elements 14 of the optical source part 10 emit optical source lights presenting different colors according to light emission parts or directions, for example, firstly the optical source lights enter the condenser lens 20 that faces the optical source part 10. The condenser lens 20 receives the optical source lights, and collects optical source lights having large optical amounts per unit area, while diffusing the optical source lights in the diffusion part 26. The optical source lights thus diffused are mixed with different colors and the density of the lights is suppressed from decreasing.

After passing through the condenser lens 20, the optical source lights of different colors are additionally mixed with one another by the composite surface 34 of the field lens 30, which is made of the optical surfaces 35 and 36 connecting to each other. The image formed by such optical source lights is projected to the windshield 3 as a projection member, it may be possible to provide an HUD apparatus 100 that concurrently attains suppression of the occurrence of color unevenness and high luminance, and offer an excellent visibility for virtual image display.

Further, according to the first embodiment, the condenser lens 20 has the first refraction surface 22, which is provided with the diffusion part 26, on a side of the optical source part 10, and has the second refraction surface 24, which is convex, on a side of the field lens 30. With the condenser lens 20 thus configured, optical source lights having large optical amounts per unit area are diffused by the diffusion part 26, as well as the enlargement effect of the diffusion part 26 are obtained using the field lens 30 and the second refraction surface 24. Consequently, it may be possible to suppress the occurrence of color unevenness and to enhance the luminance for virtual image display.

Moreover, according to the first embodiment, when the light emission elements 14 of the optical source part 10 emit optical source lights presenting different colors according to light emission parts or directions, for example, the optical source lights enter the lens elements 21 that face the light emission elements 14. Since the diffusion part 26 is formed for each lens element 21, the lens elements 21 collect optical source lights from the corresponding light emission elements 14 having large optical amounts per unit area, while diffusing the optical source lights. The optical source lights thus diffused are mixed with different colors, and the density of the lights is suppressed from decreasing.

In addition, by forming the composite surface 34 of the field lens 30, made of the optical surfaces 35 and 36 connecting to each other, on all over the lens elements 21, not only the different colors of the optical source lights in one light emission element 14 but also the different colors of optical source lights among the light emission elements 14 are mixed with one another. The optical source lights form an image and the image is projected to the windshield 3, it may be possible to surely suppress the occurrence of color unevenness even when more than one light emission element 14 are used, and to enhance the luminance for virtual image display.

Furthermore, according to the first embodiment, the composite surface 34 is made of the optical surfaces 35 and 36 connecting at least in the array direction Da of the light emission elements 14, and the width Ws of the optical surfaces 35 and 36 is smaller than the pitch Ps between the light emission elements 14 adjacent to each other in the array direction Da. With that setting, the optical source lights between the light emission elements 14 arranged in the array direction Da are surely mixed by the composite surface 34 and the effect of suppressing the occurrence of color unevenness is further enhanced accordingly.

Moreover, according to the first embodiment, the optical source lights having entered the field lens 30 are partly collected by the light collecting optical surfaces 35, and are partly deflected by the deflection optical surfaces 36 to the opposite side to the side where the lights are collected by the light collecting optical surfaces 35, so that the optical source lights of different colors are mixed with one another. Hence, the effect of suppressing the occurrence of color unevenness is further enhanced.

Furthermore, according to the first embodiment, each light emission element 14 has the blue light emission diode element 14a and the yellow fluorescent material 14b that surrounds the blue light emission diode element 14a. While the light emission elements 14 each emit a white optical source light in the center area 15 and emit a yellowish optical source light in the peripheral area 16, it may be possible to suppress the occurrence of color unevenness by the diffusion part 26 and the composite surface 34. Since the light emission elements 14 do not generate a large amount of heat, it may be possible to make the diffusion part 26 is closer to the light emission elements 14, and it may be possible that the diffusion part 26 diffuses optical source lights having large optical amounts per unit area. Hence, it may be possible to enhance the luminance for virtual image display.

The diffusion part 26 in the first embodiment has a haze value of 30% or higher, and the haze value of that level can ensure a sufficient effect of suppressing the occurrence of color unevenness by the diffusion.

Second Embodiment

Figure 8:
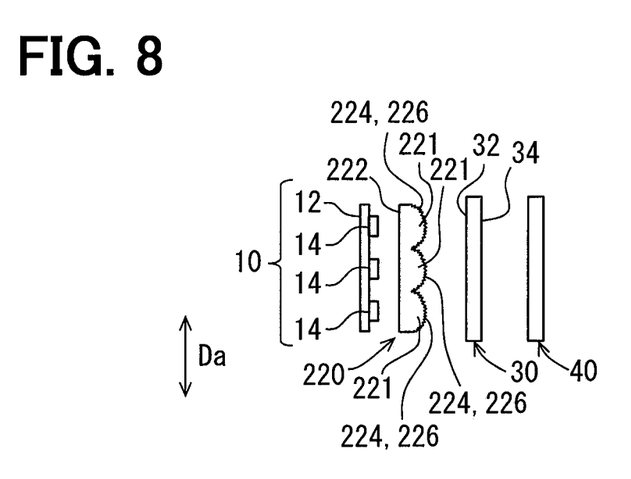
FIG. 8 is a diagram corresponding to FIG. 2 in a second embodiment.

As shown in FIG. 8, a second embodiment is a modified example of the first embodiment. The differences of the second embodiment from the first embodiment will be mainly described.

A condenser lens 220 in the second embodiment is made of translucent synthesis resin or glass, for example, as in the first embodiment and is located between the optical source part 10 and the field lens 30. Thus, the condenser lens 220 faces the optical source part 10. The condenser lens 220 is a lens array formed by arranging the same number of lens elements 221 as the number of the light emission elements 14.

Each lens element 221 in the second embodiment has a first refraction surface 222 on a side of the optical source part 10, and the first refraction surface is a single flat surface common to all the lens elements 221. The lens element 221 has a second refraction surface 224 on a side of the field lens 30, and the second refraction surface 224 is convex and is provided with a diffusion part 226. Specifically, the second refraction surface 224 is formed to be convex in a macroscopic viewpoint, and the diffusion part 226 for each lens element 221 forms a minute, random, and concavo-convex shape as of ground glass. The diffusion part 226 preferably has a haze value of 30% or higher, and has a haze value of 30% in the present embodiment.

Figure 9:
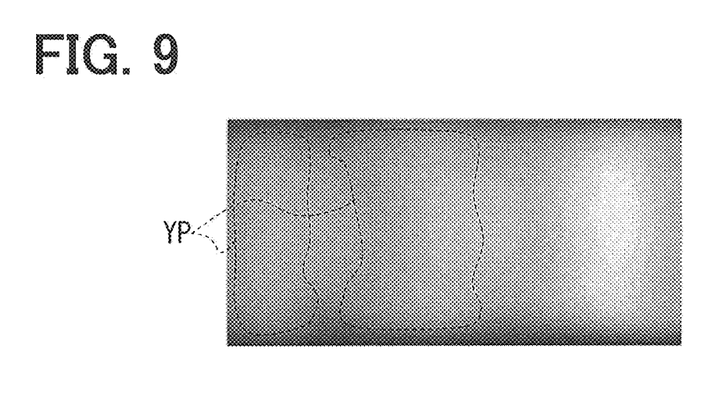
FIG. 9 is a diagram illustrating a simulation image showing a displayed virtual image observed from a right end of the eye box in the comparative example.
Figure 10:
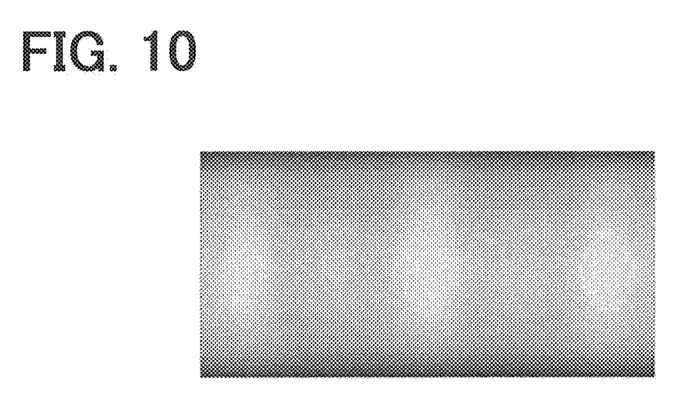
FIG. 10 is a diagram corresponding to FIG. 9 in the second embodiment.

The description will be made below on how a virtual image of an image is displayed, based on simulations by the inventor of the present application. FIG. 9 and FIG. 10 are simulation images under the condition that the displayed virtual image is observed from the right end of the eye box EB. FIG. 9 illustrates a comparative example which is different from the present embodiment in that the second refraction surface is smooth and convex (other configurations are the same as those of the present embodiment), and FIG. 10 illustrates a case of the present embodiment. The distance between each light emission element 14 and the first refraction surface 22 is set to 0.5 mm.

In the comparative example shown in FIG. 9, the center area of the displayed virtual image has not turned white partially and turned yellow (see the yellow part YP surrounded by the broken line). This indicates that the color distribution in the position of the eye box has come to reflect the light emission distribution of the light emission elements as a result of designing the device so that the light emission elements and the eye box are in a conjugate relation for increasing the usage efficiency of optical source lights. In the embodiment in FIG. 10, on the other hand, the entire region of the virtual image is prevented from turning yellow.

In the second embodiment, the condenser lens 220 has the first refraction surface 222 on a side of the optical source part 10, and has the second refraction surface 224 on a side of the field lens 30. The second refraction surface 224 is convex and is provided with the diffusion part 226. With the condenser lens 220 thus configured, the diffusion part 226 can diffuse optical source lights having large optical amounts per unit area. In that way, the occurrence of color unevenness can be suppressed and the luminance for virtual image display can be enhanced.

Other Embodiments

Although some embodiments have been described, the present disclosure is not limited to those embodiments.

For example, a first modified example of the first embodiment may be configured so that the diffusion part 26 of the first refraction surface 22 is formed of a diffusion plate or a diffusion film attached to the condenser lens 20 on a side of the optical source part 10.

A second modified example may be configured so that the diffusion part 26 is provided to both the first refraction surface 22 and the second refraction surface 24.

Figure 11:
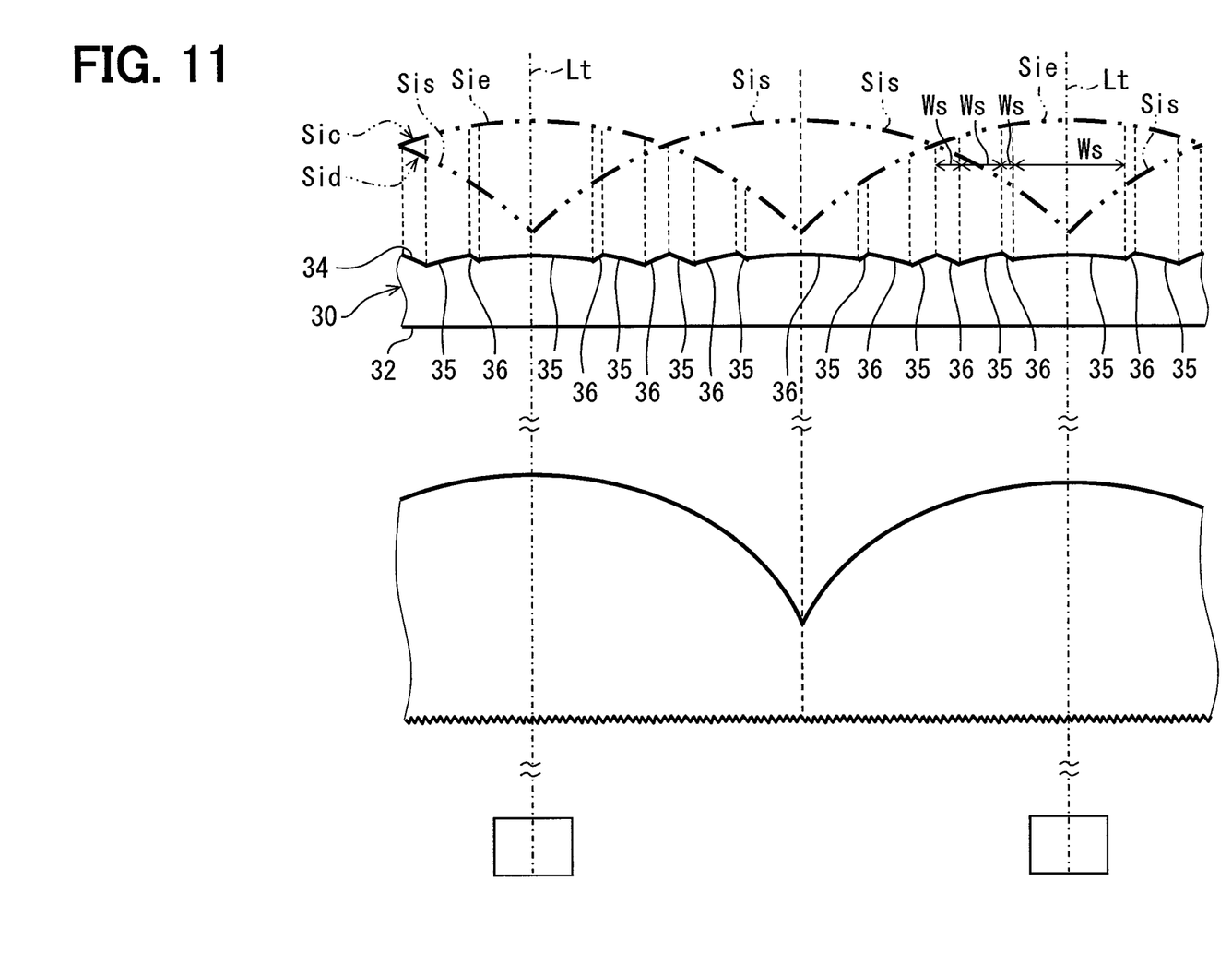
FIG. 11 is a diagram corresponding to FIG. 5 in a third modified example.

A third modified example may be configured so that each deflection optical surface 36 of the composite surface 34 may form the inclined surface Sis to be convex or concave, not flat. FIG. 11 shows a case where the surface Sis is convex.

A fourth modified example may be configured so that the field lens 30 is a Fresnel lens. In the example shown in FIG. 12, a composite surface 934 is made of light collecting optical surfaces 935 and division surfaces 936 alternately connecting to each other. Each light collecting optical surface 935 is formed to be one of the division regions made by dividing single virtual light collecting surface Sic at predetermined widths Ws in the arrangement array direction Da. A division surface 936 is formed to be a flat surface that complements the divided part of the virtual light collecting surface Sic, and is slightly inclined inversely to the inclination of the light collecting optical surface 935 adjacent to the division surface 936, in consideration of die cutting of molding.

A fifth modified example may be configured so that the composite surface 34 is formed on the surface on a side of the condenser lens 20 alone or both on the surface on a side of the condenser lens 20 and the surface on a side of the image formation element 40 as long as the composite surface 34 is formed on the surface of at least one of the condenser lens or the image formation element 40.

A sixth modified embodiment may be configured so that the light emission elements 14 are two-dimensionally arranged in the array direction Da.

A seventh modified embodiment may be configured so that the number of the light emission elements 14 is one. In that case, the field lens 30 is desirably the Fresnel lens used in the fourth modified example.

An eighth modified example may be configured so that the head-up display apparatus is applied to various types of mobile bodies (transportation systems) other than the vehicle 1, including a ship and an airplane.

Figure 5:
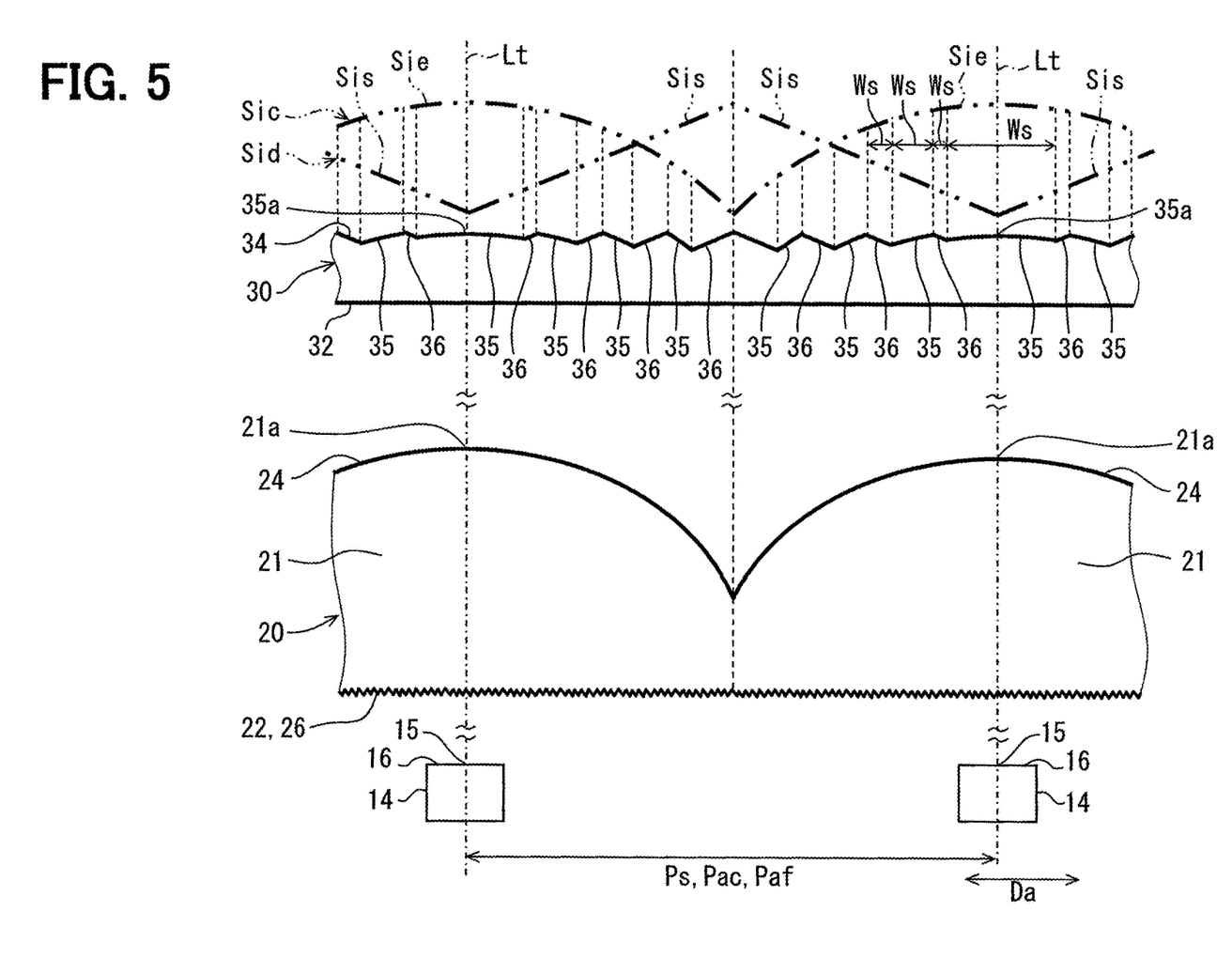
FIG. 5 is a schematic diagram illustrating a magnified part of the field lens in the first embodiment for describing the positional relation between the optical source part and the condenser lens.
Figure 12:
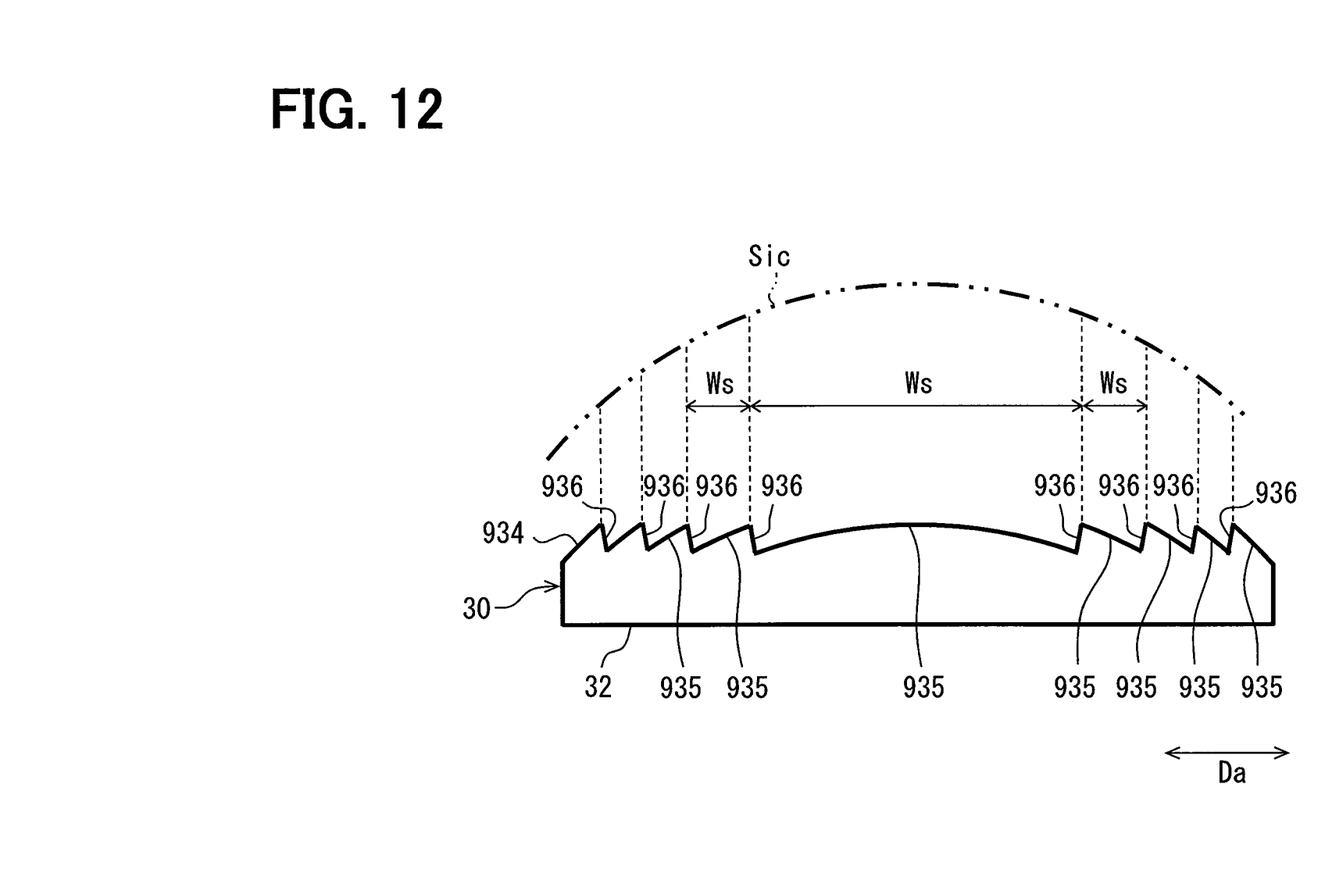
FIG. 12 is a schematic diagram illustrating a field lens in a fourth modified example.

Note that in FIG. 11 and FIG. 12, the size of a part of the predetermined width Ws is shown, as in FIG. 5.

The invention claimed is:

1. A head-up display apparatus that is mounted to a mobile body, projects an image to a projection member to display a virtual image of the image so that an occupant enables to visually confirm the image, the head-up display apparatus comprising:

an optical source that has a light emission element emitting an optical source light;

a condenser lens that faces the optical source and collects the optical source light;

a field lens that further collects the optical source light from the condenser lens and projects the optical source light at a predetermined angle; and an image formation element that forms an image by incidence of the optical source light from the field lens, and emits light of the image to the projection member, wherein:

a surface of at least one of a side of the condenser lens and a side of the image formation element of the field lens has a composite surface, the composite surface being made of a plurality of optical surfaces connecting to each other;

the condenser lens has a diffusion part that diffuses the optical source light;

the optical source has a plurality of light emission elements;

a color emitted from one of the plurality of light emission elements is different from a color emitted from an other of the plurality of light emission elements depending on light emission parts of the plurality of light emission elements or on light emission directions;

the composite surface formed on the field lens includes the plurality of optical surfaces connecting in an array direction of the light emission elements; and a width of each optical surface is smaller than a pitch between the light emission elements adjacent to each other in the array direction.

2. The head-up display apparatus according to claim 1, wherein:

the condenser lens includes a first refraction surface on a side of the optical source, and a second refraction surface on a side of the field lens;

the first refraction surface is provided with the diffusion part; and the second refraction surface has a convex surface.

3. The head-up display apparatus according to claim 1, wherein:

the condenser lens has one surface and a different surface;

the condenser lens includes as the one surface, a first refraction surface that is positioned closer to the optical source than the different surface;

the condenser lens includes as the different surface, a second refraction surface that is positioned closer to the field lens than the one surface;

the second refraction surface has a convex surface; and the condenser lens has the diffusion part on the second refraction surface.

4. The head-up display apparatus according to claim 1, wherein:

the condenser lens includes an arrangement of lens elements facing the light emission elements, respectively, and collects optical source lights from the light emission elements, respectively;

the diffusion part is provided for all the lens elements; and the field lens includes the composite surface formed over an entire surface corresponding to the lens elements.

5. The head-up display apparatus according to claim 4, wherein:

the composite surface formed on the field lens is provided for all of the lens elements of the condenser lens.

6. The head-up display apparatus according to claim 1, wherein:

the field lens includes the composite surface which provides an alternate arrangement structure of the optical surfaces, in which a light collecting optical surface and a deflection optical surface are alternately connected to each other;

the light collecting optical surface collects the optical source light; and the deflection optical surface deflects the optical source light to a side opposite to a side where the light collecting optical surface adjacent to the deflection optical surface collects the optical source light.

7. The head-up display apparatus according to claim 1, wherein:

each light emission element has a blue light emission diode element and a yellow fluorescent material that covers the blue light emission diode element.

8. The head-up display apparatus according to claim 1, wherein:

the diffusion part has a haze value of 30% or higher.

9. The head-up display apparatus according to claim 1, wherein:

the surface of the field lens having the composite surface faces at least one of the side of the condenser lens and the side of the image formation element.

10. The head-up display apparatus according to claim 1, wherein:

the light emission element has a blue light emission diode element that is placed in a center of the light emission element and is in a chip shape; and a fluorescent material that seals the blue light emission diode element and includes a yellow fluorescent agent.

11. The head-up display apparatus according to claim 1, wherein:

the field lens includes the composite surface formed over an entire surface corresponding to the lens elements.

* * * * *